(12) United States Patent
Oh et al.

(10) Patent No.: US 8,329,123 B2
(45) Date of Patent: Dec. 11, 2012

(54) METHOD FOR PREPARING OF CERIUM OXIDE POWDER FOR CHEMICAL MECHANICAL POLISHING AND METHOD FOR PREPARING OF CHEMICAL MECHANICAL POLISHING SLURRY USING THE SAME

(75) Inventors: Myoung-hwan Oh, Daejeon (KR); Jun-seok Nho, Daejeon (KR); Jang-yul Kim, Daejeon (KR); Jong-pil Kim, Daejeon (KR); Seung-beom Cho, Daejeon (KR); Min-Jin Ko, Daejeon (KR)

(73) Assignee: LG Chem. Ltd., Seoul (KR)

( * ) Notice: Subject to any disclaimer, the term of this patent is extended or adjusted under 35 U.S.C. 154(b) by 0 days.

(21) Appl. No.: 12/957,136

(22) Filed: Nov. 30, 2010

(65) Prior Publication Data

US 2011/0070737 A1 Mar. 24, 2011

Related U.S. Application Data

(62) Division of application No. 11/580,226, filed on Oct. 13, 2006, now Pat. No. 7,867,461.

(30) Foreign Application Priority Data

Oct. 14, 2005 (KR) .................. 10-2005-0097157

(51) Int. Cl.
  *C01F 17/00* (2006.01)
  *B24B 1/00* (2006.01)
  *H01L 21/302* (2006.01)
  *H01L 21/461* (2006.01)
  *C09G 1/02* (2006.01)
  *C09G 1/04* (2006.01)

(52) U.S. Cl. ........... 423/21.1; 423/263; 51/296; 51/309; 516/89; 451/36; 438/693

(58) Field of Classification Search .......... 423/21.1, 423/263; 51/296, 309; 516/89; 451/36; 438/693
See application file for complete search history.

(56) References Cited

U.S. PATENT DOCUMENTS

| 5,279,789 A * | 1/1994 | Le Loarer et al. ........... 423/21.1 |
| 5,994,260 A | 11/1999 | Bonneau et al. |
| 6,120,571 A * | 9/2000 | Aihara et al. ................... 51/309 |
| 6,343,976 B1 * | 2/2002 | Yoshida et al. ................. 451/41 |
| 6,616,514 B1 * | 9/2003 | Edelbach et al. .............. 451/60 |
| 6,887,566 B1 | 5/2005 | Hung et al. |
| 2006/0032147 A1 | 2/2006 | So et al. |

FOREIGN PATENT DOCUMENTS

| FR | 2 583 034 A1 | 12/1986 |
| JP | 10-106989 | 4/1998 |
| JP | 10-106990 | 4/1998 |
| JP | 10-106991 | 4/1998 |
| JP | 2005-126253 | 5/2005 |

OTHER PUBLICATIONS

E Aneggi, J Llorca, M Boaro, A Trovarelli, "Surface-structure sensitivity of CO oxidation over polycrystalline ceria powders," Journal of Catalysis 234 (2005), pp. 88-95.*

Tschöpe, A., Markmann, J. and Birringer, R. "Colloidal Processing of Nanocrystalline Cerium Oxide," Colloidal Processing of Nanocrystalline Cerium Oxide, in Ceramics—Processing, Reliability, Tribology and Wear, vol. 12 (ed G. Müller), Wiley-VCH Verlag GmbH & Co. KGaA, Weinheim, FRG. Jun. 27, 2000, pp. 269-273.*

Hoshino, Tetsuya, et al., Mechanism of polishing of $SiO_2$ films by $CeO_2$ particles, *Journal of Non-Crystalline Solids 283* (2001) pp. 129-136.

* cited by examiner

*Primary Examiner* — Stanley Silverman
*Assistant Examiner* — Diana J Liao
(74) *Attorney, Agent, or Firm* — McKenna Long & Aldridge LLP

(57) ABSTRACT

The present invention relates to a method of preparing a cerium oxide powder for a CMP slurry and a method of preparing a CMP slurry using the same, and more particularly, to a method of preparing a cerium oxide powder for a CMP slurry and a method of preparing a CMP slurry using the same in which the specific surface area of the powder is increased by preparing a cerium precursor, and then decomposing and calcinating the prepared cerium precursor. The pore distribution is controlled to increase the chemical contact area between a polished film and a polishing material, thereby reducing polishing time while the physical strength of powder is decreased, which remarkably reduces scratches on a polished film.

7 Claims, No Drawings ns: 10-2005-0097157, filed on
METHOD FOR PREPARING OF CERIUM OXIDE POWDER FOR CHEMICAL MECHANICAL POLISHING AND METHOD FOR PREPARING OF CHEMICAL MECHANICAL POLISHING SLURRY USING THE SAME This Divisional Application claims the benefit of U.S. patent application Ser. No. 11/580,226, filed Oct. 13, 2006, now U.S. Pat. No. 7,867,461 which is based on Korean Patent Application No. 10-2005-0097157, filed on Oct. 14, 2005, both of which are hereby incorporated herein by reference for all purposes in their entirety.

This application claims the benefit of the filing date of Korean Patent Application Nos. 10-2005-0097157 filed on Oct. 14, 2005 in the Korean Intellectual Property Office, the disclosure of which is incorporated herein in its entirety by reference.

TECHNICAL FIELD

The present invention relates to a method of preparing a cerium oxide powder for a CMP (Chemical Mechanical Polishing) slurry and a method of preparing a CMP slurry using the same, and more specifically, to a method of preparing a cerium oxide powder for a CMP slurry and a method of preparing a CMP slurry using the same in which the specific surface area of the powder is increased, and the pore distribution is controlled to increase the chemical contact area between a polished film and a polishing material. Thereby, polishing time is reduced while the physical hardness of the powder is decreased, which remarkably reduces scratches on a polished film.

BACKGROUND ART

A cerium oxide powder is a high functional ceramic powder widely used as a raw material for polishing materials, catalysts, fluorescent bodies, and the like, and has recently gained interest as an inorganic polishing material, which is a key raw material of a polishing solution for next generation CMP (Chemical Mechanical Polishing) used in an STI (Shallow Trench Isolation) process or the like, in the field of semiconductor elements.

The CMP solution used in an STI CMP process is very important for the polishing speed of a silicon oxide ($SiO_2$) film, the selective polishing characteristics between a silicon oxide film and a silicon nitride ($Si_3N_4$) film, and the scratch prevention characteristics of a polished surface. In order to realize the such removal performance, mechanical/chemical properties of the cerium oxide powder used as a polishing material should be controlled. Particularly, when a cerium oxide polishing materials are applied to CMP slurry, the study of surface properties and hardness for the polishing material is actively developed as the importance of chemical reactions on a $SiO_2$ film is emphasized.

Typically, the hardness of cerium oxide is lower than that of aluminum oxide ($Al_2O_3$) or silicon oxide ($SiO_2$), which are all used as ceramic polishing materials. Nevertheless, the reason that cerium oxide is mainly used as a polishing material for a silicon oxide film or a silica glass surface rather than the aforementioned materials is because the polishing speed is faster. This appears to be because a chemical polishing effect, as well as a mechanical polishing effect, acts when a silicon oxide film is polished by cerium oxide.

According to a research report about the chemical reactions of cerium oxide (Journal of Non-Crystalline Solid, 283 (2001) 129-136), when cerium oxide is used as a polishing material, unlike mechanical polishing for removing only a hydrated layer formed on a surface, it was shown that a silicon oxide film is polished by the chemical binding of Si—O—Ce due to the high reactivity of cerium oxide with silicon oxide. The cerium oxide removes silicon oxide lumps as if by plucking off from a silicon oxide film surface. Accordingly, in order to obtain a faster polishing speed, the chemical reactivity level, specific surface area, appropriate strength of the polishing particles and the like, should be controlled above anything else on a particle surface.

On the other hand, for a method of enhancing the chemical reactivity of ceramic particles, a method of increasing a grain boundary having high chemical activity is most representative. Ceramic particles have a characteristic of being more chemically stable by having a perfect crystalline structure as they enter into the particles. On the contrary, the grain boundary or surface has an imperfect crystalline structure because the crystalline structure cannot be fundamentally perfect, and also is in a high state of chemical reactivity to accept other elements or ions for supplementing such an imperfect crystalline structure. Therefore, when the cerium oxide powder has a higher specific surface area per gram, it will have a higher chemical reactivity and Si—O—Ce binding is generated over a broader area, thereby improving polishing speed.

DISCLOSURE

Technical Problem

The mechanical hardness of a polishing material is regarded as being very important in a CMP process. The mechanical hardness of a polishing material is closely related to the problem of scratches in the CMP process of a silicon oxide film. It is considered that scratches on a polished film are generated by the mechanical polishing apparatus rather than by a chemical reaction, and there is a high possibility that they are generated by a polishing material having high strength and a large size. However, when the strength of a polishing material is reduced by considering only such issues, the problem of scratches on a polishing film can be solved but the polishing speed becomes low, thereby causing an additional problem of having difficulty in applying the polishing material to an actual process.

As a conventional technology for a cerium oxide polishing material and polishing solution, WO 1999/31195 has disclosed a method in which 30-100 μm diameter cerium oxide particles for polishing are prepared by calcination in an oxygen atmosphere at temperatures of 400-900° C. for 5-300 minutes using a raw cerium oxide material such as carbonate, sulfate, and oxalate, and the required particle size is controlled by using a dry and wet mill. However, there has been a problem in that the hardness of the cerium oxide crystal prepared by this method is affected by the calcinating temperature such that, when calcinated at a higher temperature, the hardness of the powder is increased while the surface area is reduced. Moreover, since it is a system in which the powder is thermally treated at an appropriate calcinating temperature to obtain a desired powder hardness, and the surface area is determined by the hardness, there is a limit in solving both the problems of polishing speed and scratching.

Technical Solution

In order to solve the aforementioned problems in the prior art, an object of the present invention is to provide a method of preparing a cerium oxide powder for a CMP slurry, a cerium oxide powder for a CMP slurry prepared using the same method, a cerium oxide dispersed solution composition for a CMP slurry, a method of preparing a CMP slurry, and a method of planarizing semiconductor elements in which the specific surface area of the powder is increased, and the pore distribution is controlled so as to increase the chemical contact area between a polished film and a polishing material, thereby reducing the polishing time.

Another object of the present invention is to provide a method of preparing a cerium oxide powder for a CMP slurry, a cerium oxide powder for a CMP slurry prepared using the same method, a cerium oxide dispersed solution composition for a CMP slurry, a method of preparing a CMP slurry, and a method of planarizing semiconductor elements in which the physical strength of the powder is decreased, thereby remarkably reducing scratches on a polished film and at the same time enabling a fast polishing speed.

In order to solve the aforementioned objects, there is provided a method of preparing a cerium oxide powder for a CMP slurry comprising the steps of:
(a) preparing a cerium precursor;
(b) decomposing the prepared cerium precursor; and
(c) calcinating the decomposed cerium precursor.

Furthermore, the cerium oxide powder for a CMP slurry prepared by the method of the present invention has crystalline particles of 10-60 nm diameter, a specific surface area of at least 5-55 $m^2/g$, and a pore distribution ratio, of pores less than and greater than 3 nm, of between 2:8 and 8:2.

Furthermore, the present invention provides a cerium oxide dispersed solution composition for a CMP slurry comprising:
(a) the prepared cerium oxide powder;
(b) a dispersing agent; and
(c) water.

Furthermore, the present invention provides a method of preparing a CMP slurry, comprising the steps of:
(a) titrating the pH of the cerium oxide dispersed composition for a CMP slurry; and
(b) dispersing and stabilizing the pH-titrated cerium oxide dispersed solution composition.

Furthermore, the present invention provides a method of planarizing semiconductor elements, wherein the CMP slurry is applied to the elements.

Advantageous Effects

According to the present invention, the specific surface area of the powder is increased, and the pore distribution is controlled so as to increase the chemical contact area between a polished film and a polishing material. Thereby, the polishing time is reduced while the physical hardness of the powder is decreased, which remarkably reduces scratches on a polished film.

BEST MODE

Hereinafter, the embodiments of the present invention will be described in detail.

Conventionally, a restricted method has been used in which the property of a powder is determined by the calcinating temperature when calcinating a cerium raw materials to obtain a cerium oxide. Thus, the inventors of the present invention have made it possible that a cerium precursor is synthesized, and then a material acting to form pores from the synthesized cerium precursor (hereinafter, pore generator is decomposed to control the properties of the powder. In other words, a mechanism is applied in which the pore generator contained into the cerium precursor is decomposed so as not to react thereafter, and then the precursor is calcinated, thereby maintaining a few to several hundred Å of pores in the powder intact.

A cerium oxide powder for a CMP slurry according to an embodiment of the present invention is characterized in that it is prepared by the steps of preparing a cerium precursor, decomposing the prepared cerium precursor, and calcinating the decomposed cerium precursor.

A method of preparing a cerium oxide powder for a CMP slurry according to an embodiment of the present invention will be described in detail below.

(1) Step of Preparing Cerium Precursor

This is a step for preparing a cerium precursor.

The cerium precursor is not especially limited, but is preferably selected from a group consisting of carbonate, hydroxide salt, chloride salt, oxalate, and sulfate. Among these, a carbonate containing $CO_2$ or $H_2O$ gas is more preferably used because it is excellent of forming pores even when it is only used alone.

The raw material for the cerium precursor may be selected from a group consisting of cerium nitrate, cerium acetate, cerium chloride, and cerium sulfonate. Cerium nitrate or cerium acetate, which is a raw material of the carbonate, is preferably used.

Furthermore, in preparing the cerium precursor, a precipitation agent which is used in preparing a typical cerium precursor can be used, and more specifically a compound of ammonia is preferably used, particularly urea or ammonium carbonate.

In preparing a cerium precursor as described above, pores can be formed in the finally obtained cerium precursor according to the kind of raw material, and at this time a pore generator can be additionally used, if necessary, to facilitate forming pores.

For the added pore generator, an organic molecule, an organic polymer, or an organic solvent can be used. The pore generator is combined through the adsorption on crystal faces constituting a cerium precursor, and it is easily vaporized by heat.

The pore generator that can be added are not especially limited, but the pyrolysis of a precursor is typically performed at temperatures of 150-400° C., and therefore it is preferable to use an organic molecule or organic polymer which can be pyrolyzed with such a precursor.

Specifically, the organic molecule or organic polymer is selected from a group consisting of an aliphatic hydrocarbon, an aromatic hydrocarbon, an ether-based compound, an anhydride-based compound, a carboxyl-based compound (itaconic acid, etc), a carbonate-based compound, an acrylic compound, a thio ether-based compound, an isocyanate-based compound, a sulfone-based compound, a sulfate ion compound (ammonium sulfate, etc.), a sulfoxide-based compound, which can all be pyrolyzed at temperatures of up to 150-450° C., an alkylene oxide polymer and an acrylate polymer, which are easily dissolved and can be pyrolyzed at temperatures of up to 150-450° C.

The organic molecule or organic polymer preferably has an average molecular weight of 10-100,000, and more preferably 100-10,000. If the average molecular weight is less than 10, there is a problem in that it is difficult to handle and it is also difficult to apply to a process because it will have strong volatility, and in the case where it exceeds 100,000, there is a problem in that it is difficult to control particle size because the size of the prepared powder particles becomes large.

The organic molecule or organic polymer is preferably contained at 0.0005-5 weight % per the weight of cerium precursor, and in the case where the content is less than 0.0005 weight % there is a problem in forming pores because the amount is small, and in the case where it exceeds 5 weight % there is a problem in that cohesion between powder particles is excessively created, and huge powder particles are formed.

Furthermore, for the organic solvent, an alcohol-based or glycol-based compound can be used, and preferably it has a dielectric constant of 10-80. Specifically, the organic solvent is selected from a group consisting of methanol, ethanol, propanol, butanol, ethylene glycol, propylene glycol, butylene glycol, acetone, glycerine, formic acid, and ethylacetate. The organic solvent can be used singly or by mixing two or more kinds thereof, and may be used by mixing with water. The organic solvent and water are preferably mixed at a weight ratio between 0.01:3 and 1:0.01, and more preferably at a weight ratio between 0.05:1 and 1:1. In general, the shape and size of powder particles, as well as the formation of pores, can be controlled according to the amount of added organic solvent, and it acts very favorably in controlling the size of powder particles in the subsequent process of grinding and dispersing when considering that the shape and size of cerium oxide follows the shape and size of cerium carbonate after thermal treatment. Moreover, when the amount of organic solvent increases, the solubility becomes low so that it is difficult to react by dissolving a reactant, and in such a case, heat is applied to allow for a reaction causing a deviation between lots in the process. However, when the mixing ratio is within the above range, the reaction can be made without such a problem.

The synthesis of a cerium precursor can be prepared by using a solution state method such as a typical precipitation method, a uniform precipitation method, a hydrothermal synthesis method, or the like, and particularly, according to the present invention, it is prepared by reacting at temperatures of 80-99° C. for 2-60 hours using a uniform precipitation method.

(2) Step of Decomposing Cerium Precursor

This is a step for decomposing a cerium precursor prepared as described above. The 'decomposing of a cerium precursor' means to remove a pore generator contained in the prepared cerium precursor, and through this process it is possible to control the specific surface area, pore distribution, and hardness of particles.

This process is implemented so as to maintain the temperature for a predetermined period of time at the temperature just prior to oxidizing the cerium precursor, thereby preventing the pores from closing, and benefit from the specific surface area of the powder and pore forming activity.

This decomposing allows the specific surface area, pore distribution, and hardness of cerium powder to be controlled according to the kind of pore generator contained in the cerium precursor. The method of decomposing can be performed according to the kind of pore generator, and more specifically, a method such as thermal treatment or hydrogen peroxide treatment can be used.

The thermal treatment method can be performed by adding oxygen, nitrogen, argon, or an inert gas and by thermally treating the powder in an oxygen atmosphere at temperatures of 200-450° C. for 1-100 hours. It is favorable if oxygen is 1-99 volume % to ensure an atmosphere for sufficient oxidation. When the temperature is less than 200° C., there is a problem in that it cannot benefit from the process because the pore generator is not sufficiently decomposed, and when the temperature exceeds 450° C., there is a problem in the pores close because the high temperature acts to maintain pores.

The hydrogen peroxide treatment method oxidizes a trivalent cerium compound into hydrogen peroxide, which is an oxidizer, and typically the cerium compound is dispersed in water using a mixer, and then oxidized by adding hydrogen peroxide. It is preferable that the concentration of the cerium compound dispersed in water is within the range of 1-30 weight % in consideration of the easiness of dispersion.

Furthermore, it is preferable that the hydrogen peroxide is added at a concentration of 1-10 mol % with respect to 1 mol of cerium compound. This is because sufficient oxidation cannot be accomplished when the concentration of hydrogen peroxide is less than 1 mol, and the compound dissolves when the concentration exceeds 10 mol.

The treatment temperature is not especially limited, but it is preferable that treatment occurs with mixing for an hour within the temperature range of 60-100° C. This is because the compound is not decomposed by hydrogen peroxide when the temperature is less than 60° C., and boiling occurs when the temperature exceeds 100° C.

The cerium oxide prepared through decomposing the cerium precursor may be used intact as a polishing material for CMP, but preferably it is used after passing through a grinding and dispersing process as described below.

(3) Grinding and Dispersing Step

The present invention selectively passes through a step of dispersing and grinding the cerium precursor, thereby reducing the strength of cerium oxide and providing a high porosity fraction.

The grinding and dispersing step can be accomplished through a pre-grinding method for grinding and dispersing coarse and large particles, and it is preferably performed by a dry grinding and dispersing method. The dry grinding and dispersing method may be one of jet mill, disc mill, and beads methods, but it is not necessarily limited to these.

When the cerium precursor passes through a grinding and dispersing step small-sized particles are formed, and when the particles pass through a calcinating step as described below they are calcinated in an agglomerate state in which small particles are cohered in order to form particles having many pores.

When the cerium oxide, which has been prepared by passing through such a grinding and dispersing step, is used as a polishing material, particles will be broken during polishing such that closed pores are changed to open pores, thereby causing an increase of the pore volume measured by BET. In other words, after polishing $SiO_2$ on a Si substrate with a pressure of 200-400 g/cm$^3$, the pore volume fraction of at least 3 nm in the cerium oxide powder is increased by 10-50 volume % when compared to the volume prior to polishing.

Moreover, when mechanically polished with a high strength silicon nitride film, a skeleton constituting cerium oxide powder can be easily broken and changed to smaller particles, thereby remarkably reducing the polishing speed with respect to the silicon nitride film. On the other hand, with respect to a silicon oxide film, since chemical polishing is used in addition to mechanical polishing, the polishing speed will not be reduced and will be maintained constantly.

Furthermore, they can be easily broken due to the low strength of cerium oxide powder, and therefore micro-scratch generation, which is formed by large particles, can also be prevented.

(4) Calcinating Step

This is a step for calcinating a cerium precursor in which a pore-forming material has been removed by a thermal treatment or a hydrogen peroxide treatment as described above.

The calcinating process can be performed intact, but it is preferable that it be performed in an oxygen atmosphere, and preferably performed at temperatures of 500-1000° C. for 10 minutes-6 hours.

Furthermore, the present invention provides a cerium oxide powder as described above with a crystalline size of 10-60 nm, a specific surface area of 5-55 m$^2$/g, and a pore distribution ratio, of pores less than and over 3 nm, between 2:8 and 8:2. If the crystalline size of the cerium oxide is less than 10 nm, polishing time tends to slow down, and if it exceeds 60 nm serious scratches may occur on the polishing surface.

Furthermore, the present invention provides a cerium oxide dispersed solution composition for a CMP slurry, comprising a cerium oxide powder prepared as described above, a dispersing agent, and water.

The dispersing agent is one that is used in a typical cerium oxide dispersed solution composition, and particularly it can be one selected from a group consisting of an anionic polymer, such as poly vinyl alcohol (PAA), ethylene glycol (EG), glycerine, poly ethylene glycol (PEG), polyacrylic acid, ammonium salt polyacrylic acid, or polyacrylic acid-co-maleic acid; a nonionic dispersant; and an anionic dispersant.

It is preferable that there is 0.0001-10.0 weight part of the dispersing agent for 100 weight part of the cerium oxide slurry, and more preferably 0.02-3.0 weight part of dispersing agent. If the content is less than 0.0001 weight parts the dispersion force is low and precipitation progresses quickly, thereby generating precipitation even when a polishing solution is transferred, and accordingly there is the polishing solution cannot be uniformly supplied, and if the content exceeds 10.0 weight parts a dispersing agent layer acting as a kind of cushion around the polishing material particles can be formed thickly as well as the dispersion force, and accordingly the polishing speed is reduced because the chances of putting a polishing material surface into contact with a silica polishing surface are decreased.

It is favorable that there are 90-99 weight parts of water for 100 weight parts of cerium oxide slurry such that cerium oxide particles in a cerium oxide dispersed solution composition for a CMP slurry become 1-10 weight %.

As described above, a cerium oxide dispersed solution composition for a CMP slurry containing cerium oxide powder, a dispersing agent, and water according to the present invention can be prepared into a CMP slurry by titrating the pH, and dispersing and stabilizing the composition afterwards.

It is favorable that the pH of the cerium oxide dispersed solution is titrated to 6-8, and it can be achieved by adding 1N KOH, or 1N HNO$_3$, when the pH is titrated.

The pH titration is completed as described above, and then a dispersion stabilization step is performed to improve the dispersion and storage stability.

The dispersion stabilization step can be performed by using a typical dispersing device, and specifically a device such as an APEX mill (Kotobuki Eng. & Mfg. Co., Ltd., Japan) can be used.

It is preferable that the AFEX mill used in the dispersion stabilization step use beads having a size of 0.01-1 mm, the cerium oxide slurry flows in at a speed of 1,000 mL/min using a pump, and it rotates for 1-20 passes repeatedly at a speed of 2,000-5,000 rpm.

Moreover, the present invention provides a planarization method for semiconductor elements in which the CMP slurry is applied to the elements, and the planarization method for semiconductor elements can be, as a matter of course, performed by a method commonly used in a relevant industry.

According to the present invention as described above, the specific surface area of a powder is increased, and the pore distribution is controlled so as to increase the chemical contact area between a polished film and a polishing material, thereby reducing polishing time while the physical strength of the powder is decreased, which remarkably reduces scratches on a polished film.

Moreover, the cerium oxide powder of the present invention as described above is mainly used for a semiconductor CMP application, but it in not necessarily limited to this, and can also be used for a polishing material application in other fields in which a high-polishing selectivity ratio and microscratch removal are important.

Hereinafter, several preferred embodiments will be presented in order to help the understanding of the present invention, however, the following embodiments are only for the purpose of exemplifying the present invention and the scope of the present invention is not limited to the following embodiments.

EMBODIMENTS

Embodiment 1

(Preparation of Cerium Oxide Powder)

0.5 mol of cerium nitrate was dissolved in 100 mL of distilled water, and itaconic acid was added as a pore-forming material at 0.3 weight % of the cerium nitrate and agitated until it was completely dissolved. Then, 1.5 mol of urea as a precipitation agent was dissolved in 100 mL of distilled water, and then the two prepared solutions were mixed in a 500 mL precipitation reactor. A precipitation reaction was carried out at 96° C. for 20 hours while stirring at a speed of 200 rpm using a mixer. The obtained powder was centrifuged and washed, and then dried in a drying oven at 100° C. for 24 hours. The powder was then analyzed by XRD, and as a result it was confirmed to be cerium carbonate of a rhombic system.

1.5 kg of the cerium carbonate powder was placed into an alumina crucible and the decomposed material was removed by thermally treating it in an oxygen atmosphere at 350° C. for 24 hours. 1.2 kg of oxide was obtained.

The powder was calcinated in an oxygen atmosphere at 750° C. for one hour and 1.2 kg of yellow powder was obtained. The XRD measurement confirmed that this was cerium oxide having a crystal size of 26 nm. Furthermore, the BET analysis confirmed that it had a specific surface area of 34 m$^2$/g, the pore distribution, of pores less than and over 3 nm, was distributed at a rate of 37:63, and the average particle diameter was 84-441 nm. A half value width of the major peak of the crystallinity of the cerium oxide was analyzed by using X-ray diffraction spectroscopy and measured by the Scherrer equation, and the specific surface area was measured using an ASAP 2010 (Micrometrics Corp., USA) by a BET method.

(Preparation of Cerium Oxide Dispersed Solution)

Polyacrylic acid (Aldrich, Mw 4,000) was mixed with 1 kg of the prepared cerium oxide powder, 9 kg of hyperpure water, and a dispersing agent at an amount of 2 weight % of the cerium oxide powder, and a cerium oxide dispersed solution containing cerium oxide particles at 2 weight % was produced.

(Preparation of CMP Slurry)

The prepared cerium oxide dispersed solution was titrated to pH 7 using ammonia solution, and then a dispersion stability improvement and particle size process was performed using an AFEX mill. The AFEX mill used zirconia beads having a size of 0.1 mm, the transfer speed was 400 mL/min, and 3 passes at a speed of 3,750 rpm were performed to adjust the average particle size to 136 nm.

In order to measure the polishing capacity of the prepared CMP slurry, POLI-400 of Korea G & P Technology, which is used for polishing 5-inch wafers, was used as a CMP polishing device, and a 5-inch blanket wafer coated with a PECVD (Plasma Enhanced Chemical Vapor Deposition) oxide film and a nitride film was used as an object wafer.

The wafer was adhered to a substrate holder (head) of the CMP polishing device, and polished for one minute while 100 mL/minute of the prepared CMP slurry was added to a polishing table adhered with a polyurethane polishing pad. The substrate holder was pressed onto the table with a pressure of 280 g/cm$^3$, and it was polished while rotating the substrate holder and the table at 90 rpm respectively. After being polished, the substrate was cleanly washed and the thickness was measured (Nanospec 6100, Nanometric Co., Ltd., USA). As a result the polishing speed of the oxide film was 3,769 Å/min and the polishing speed of the nitride film was 42 Å/min. Moreover, after observation with an optical microscope, it was confirmed that there were no micro scratches.

Embodiment 2

(Preparation of Cerium Oxide Powder)

A cerium oxide powder was produced in the same manner as described in Embodiment 1 except ammonium sulfate ($(NH_4)_2SO_4$), which is a sulfate ion compound, was used as a pore-forming material at 0.3 weight % of the cerium nitrate, and a cerium oxide powder having a crystal size of 26 nm, a specific surface area of 23 m$^2$/g, a pore distribution of 3-10 nm being distributed at a rate of 42% of the total pores, and an average particle diameter of 65-473 nm, was obtained.

(Preparation of Cerium Oxide Powder Dispersed Solution)

A cerium oxide powder dispersed solution was obtained in the same manner as Embodiment 1 described above.

(Preparation of CMP Slurry)

A CMP slurry was prepared in the same manner as described in Embodiment 1 except the average particle size was adjusted to 152 nm.

The polishing capacity of the prepared CMP slurry was measured, and as a result the polishing speed of the oxide film was 3,406 Å/min and the polishing speed of the nitride film was 39 Å/min. Moreover, after observation with an optical microscope it was confirmed that there were no micro scratches.

Embodiment 3

(Preparing of Cerium Oxide Powder)

A cerium oxide powder was produced in the same manner as described in Embodiment 1 except 0.5 mol of cerium nitrate was dissolved in a solution of 10 mL of water and 90 mL of ethanol, and then mixed with a solution in which 1.5 mol of urea solution was dissolved in a solution of 10 mL of water and 90 mL of ethanol to obtain a cerium carbonate powder. 1.5 kg of the cerium carbonate powder was placed into an alumina crucible and the decomposed material was removed by thermal treatment in an oxygen atmosphere at 300° C. for 24 hours to obtain 1.2 kg of oxide, which was then calcinated in an oxygen atmosphere at 700° C. for one hour. A cerium oxide powder having a crystal size of 24 nm, a specific surface area of 44 m$^2$/g, a pore distribution, of pores less than and over 3 nm, of 33:67, and an average particle diameter of 68-510 nm, was obtained.

(Preparation of Cerium Oxide Powder Dispersed Solution)

A cerium oxide powder dispersed solution was obtained in the same manner as Embodiment 1 described above.

(Preparation of CMP Slurry)

A CMP slurry was prepared in the same manner as described in Embodiment 1 except the AFEX mill performed 8 passes, and the average particle size was adjusted to 143 nm.

The polishing capacity of the prepared CMP slurry was measured, and as a result the polishing speed of the oxide film was 3,163 Å/min and the polishing speed of the nitride film was 31 Å/min. Moreover, after observation with an optical microscope, it was confirmed that there were no micro scratches.

Embodiment 4

(Preparation of Cerium Oxide Powder)

A cerium oxide powder was produced in the same manner as described in Embodiment 2 except a pore-forming material was not used, and a cerium oxide powder having a crystal size of 26 nm, a specific surface area of 30 m$^2$/g, a pore distribution, of pores less than and over 3 nm, of 59:31, and an average particle diameter of 121 nm-730 nm, was obtained.

(Preparation of Cerium Oxide Powder Dispersed Solution)

A cerium oxide powder dispersed solution was obtained in the same manner as Embodiment 2 described above.

(Preparation of CMP Slurry)

A CMP slurry was prepared in the same manner as described in Embodiment 2 except the AFEX mill performed 5 passes, and the average particle size was adjusted to 148 nm.

The polishing capacity of the prepared CMP slurry was measured, and as a result the polishing speed of the oxide film was 3,443 Å/min and the polishing speed of the nitride film was 43 Å/min. Moreover, after observation with an optical microscope, it was confirmed that there were no micro scratches.

Comparative Example 1

(Preparation of Cerium Oxide Powder)

A cerium oxide powder was produced in the same manner as described in Embodiment 4 except the cerium carbonate powder was not placed into an alumina crucible, the decomposed material was removed by thermal treatment in an oxygen atmosphere at 350° C. for 24 hours, and a step of direct calcination was implemented. The cerium oxide powder obtained had a crystal size of 39 nm, a specific surface area of 12 m$^2$/g, a pore distribution, of pores less than and over 3 nm, of 84:16, and an average particle diameter of 177 nm-853 nm.

(Preparation of Cerium Oxide Powder Dispersed Solution)

A cerium oxide powder dispersed solution was obtained in the same manner as Embodiment 4 described above.

(Preparation of CMP Slurry)

A CMP slurry was prepared in the same manner as described in Embodiment 4 above except the average particle size was adjusted to 138 nm. The polishing capacity of the prepared CMP slurry was measured, and as a result the polishing speed of the oxide film was 2,627 Å/min and the polishing speed of the nitride film was 66 Å/min. Moreover, after observation with an optical microscope, it was confirmed that there were no micro scratches.

The particle diameter, polishing speed, selectivity ratio, and micro-scratches, which were measured for the CMP slurries prepared in Embodiments 1 through 4, and Comparative Example 1, are shown in Table 1 below.

TABLE 1

|  | crystalline size (nm)/ specific surface area (m²/g) | avarage particle size (nm) | polishing speed (Å/mm) | | selectivity ratio | micro-scratch |
|---|---|---|---|---|---|---|
|  |  |  | oxide film | nitride film |  |  |
| Embodiment 1 | 26/34 | 146 | 3,769 | 42 | 90 | none |
| Embodiment 2 | 27/23 | 152 | 3,406 | 39 | 87 | none |
| Embodiment 3 | 27/44 | 143 | 3,163 | 31 | 102 | none |
| Embodiment 4 | 26/30 | 148 | 3,443 | 43 | 80 | none |
| Comparative Example 1 | 39/12 | 138 | 2,627 | 66 | 40 | none |

The results in Table 1 above confirm that, for a CMP slurry of Embodiments 1 through 4 prepared by decomposing the cerium oxide powder prior to calcination after preparing a cerium precursor according to the present invention, the crystalline size was small, the specific surface area was large, and the particle size of cerium oxide was also large when compared with Comparative Example 1. Moreover, the polishing speed of an oxide film was remarkably higher when compared with a nitride film, thereby having an excellent removal selectivity ratio.

In particular, in Embodiment 1 where itaconic acid, which is a carboxyl-based compound, was used as a pore generator, large pores were formed, in the case of Embodiment 2 where a sulfate ion was used, pores within a specific range were formed, and in the case of Embodiment 3 the specific surface area was affected.

According to the present invention, the specific surface area of a powder is increased, and the pore distribution is controlled to increase the chemical contact area between a polished film and a polishing material, thereby reducing polishing time while the physical hardness of powder is decreased, which remarkably reduces scratches on a polished film.

Although only a few exemplary embodiments of the present invention have been described in detail, it will be appreciated by those skilled in the art that various changes and modifications can be made without departing from the principles and spirit of the present invention, the scope of which is defined in the appended claims.

INDUSTRIAL APPLICABILITY

The present invention provides a method of preparing a cerium oxide powder for a CMP slurry, a cerium oxide powder for a CMP slurry prepared using the same method, a cerium oxide dispersed solution composition for a CMP slurry, a method of preparing a CMP slurry, and a method of planarizing semiconductor elements in which the specific surface area of the powder is increased, and the pore distribution is controlled to increase the chemical contact area between a polished film and a polishing material, thereby reducing polishing time.

The invention claimed is:

1. A cerium oxide powder for a CMP slurry, the cerium oxide powder having a crystal size of 10-60 nm, a specific surface area of 5-55 m²/g, and a pore distribution, such that the ratio of the number of pores less than 3 nm to the number of pores greater than 3 nm is between 2:8 and 8:2, and the CMP slurry having a selectivity ratio between a polishing speed of an oxide film and a polishing speed of a nitride film of 80-102.

2. A cerium oxide dispersed solution composition for a CMP slurry, which comprises:
   (a) a cerium oxide powder prepared by a method comprising the steps of:
      (a') preparing a cerium precursor,
      (b') decomposing the prepared cerium precursor, and
      (c') calcining the decomposed cerium precursor;
   (b) a dispersing agent; and
   (c) water,
   wherein the cerium oxide powder has a crystal size of 10-60 nm, a specific surface area of 5-55 m²/g, and a pore distribution, such that the ratio of the number of pores less than 3 nm to the number of pores greater than 3 nm is between 2:8 and 8:2, and the CMP slurry has a selectivity ratio between a polishing speed of an oxide film and a polishing speed of a nitride film of 80-102.

3. The cerium oxide dispersed solution composition for a CMP slurry according to claim 1 comprising:
   (a) 100 weight parts of the cerium oxide powder;
   (b) 0.0001-10.0 weight parts of the dispersing agent; and
   (c) 90-99 weight parts of water.

4. The cerium oxide dispersed solution composition for a CMP slurry according to claim 1, wherein the dispersing agent is one or more selected from the group consisting of polyvinyl alcohol (PAA), ethylene glycol (EG), glycerine, polyethylene glycol (PEG), polyacrylic acid, ammonium salt polyacrylic acid, poly(acrylic acid-co-maleic acid), nonionic dispersants and anionic dispersants.

5. A method of preparing a CMP slurry, which comprises the steps of:
   (a) titrating the pH of the cerium oxide dispersed composition for a CMP slurry as specified in claim 1; and
   (b) dispersing and stabilizing the pH-titrated cerium oxide dispersed solution composition.

6. The method of preparing a CMP slurry according to claim 5, wherein in the pH titration in step (a) the pH is adjusted to pH 6-8 by adding 1N KOH or 1N HNO₃.

7. A method of planarizing semiconductor elements, wherein the CMP slurry as specified in claim 5 is applied to the semiconductor elements.

* * * * *